(12) United States Patent
Hara

(10) Patent No.: US 10,066,673 B2
(45) Date of Patent: Sep. 4, 2018

(54) BICYCLE CRANK ASSEMBLY

(71) Applicant: Shimano Inc., Sakai, Osaka (JP)

(72) Inventor: Nobukatsu Hara, Osaka (JP)

(73) Assignee: Shimano Inn., Osaka (JP)

( * ) Notice: Subject to any disclaimer, the term of this patent is extended or adjusted under 35 U.S.C. 154(b) by 178 days.

(21) Appl. No.: 15/362,415

(22) Filed: Nov. 28, 2016

(65) Prior Publication Data

US 2017/0167542 A1    Jun. 15, 2017

(30) Foreign Application Priority Data

Dec. 14, 2015  (JP) ................ 2015-243372

(51) Int. Cl.

| | | |
|---|---|---|
| *B62M 3/00* | (2006.01) | |
| *F16D 3/06* | (2006.01) | |
| *B62M 1/36* | (2013.01) | |
| *F16H 55/30* | (2006.01) | |
| *B62M 9/14* | (2006.01) | |

(52) U.S. Cl.
CPC ............... *F16D 3/065* (2013.01); *B62M 1/36* (2013.01); *B62M 3/00* (2013.01); *B62M 3/003* (2013.01); *B62M 9/14* (2013.01); *F16H 55/30* (2013.01); *F16D 2300/06* (2013.01)

(58) Field of Classification Search
CPC .......... B62M 3/00; B62M 3/003; B62M 3/04; B62M 3/08; B62M 3/083; B62M 3/086; B62M 9/12; B62M 9/124
See application file for complete search history.

(56) References Cited

U.S. PATENT DOCUMENTS

| | | | | |
|---|---|---|---|---|
| 6,173,982 | B1 * | 1/2001 | Westergard ............ | B62M 9/085 280/261 |
| 7,153,229 | B2 * | 12/2006 | Matsumoto ............ | B62M 9/126 474/144 |
| 7,686,716 | B2 * | 3/2010 | Matsumoto .............. | B62M 9/10 474/80 |
| 8,371,974 | B2 * | 2/2013 | Morita ..................... | B62M 9/16 280/261 |
| 2004/0014543 | A1 * | 1/2004 | Van Der Linde ........ | B62M 9/04 474/160 |
| 2004/0214670 | A1 * | 10/2004 | Matsumoto ............ | B62K 25/28 474/78 |
| 2006/0240919 | A1 * | 10/2006 | Matsumoto .............. | B62M 9/04 474/78 |
| 2013/0008282 | A1 | 1/2013 | Johnson et al. | |
| 2015/0274253 | A1 * | 10/2015 | Hara ....................... | B62M 1/36 74/594.2 |

FOREIGN PATENT DOCUMENTS

| | | |
|---|---|---|
| FR | 2881199 A1 | 7/2006 |
| WO | 2013/009562 A2 | 1/2013 |

* cited by examiner

*Primary Examiner* — Richard W Ridley
*Assistant Examiner* — Brian J McGovern
(74) *Attorney, Agent, or Firm* — Global IP Counselors, LLP

(57) ABSTRACT

A bicycle crank assembly includes a sprocket having a rotational center axis, a crank, a crank axle and a slide mechanism. The crank axle is attached to the crank and includes an internal space. The slide mechanism is configured to displace the sprocket relatively to the crank in an axial direction parallel to the rotational center axis. At least part of the slide mechanism is disposed in the internal space of the crank axle.

37 Claims, 11 Drawing Sheets

BICYCLE CRANK ASSEMBLY

CROSS-REFERENCE TO RELATED APPLICATIONS

This application claims priority to Japanese Patent Application No. 2015-243372, filed on Dec. 14, 2015. The entire disclosure of Japanese Patent Application No. 2015-243372 is hereby incorporated herein by reference.

BACKGROUND

Field of the Invention

The present invention generally relates to a crank assembly. The present invention more particularly relates to a bicycle crank assembly with a rotational center axis.

Among bicycles equipped with a single front sprocket and a plurality of rear sprockets, gear shifting has been conventionally carried out by operation of a rear derailleur. When a gear shifting operation is performed by operation of the rear derailleur, chances are that a chain is disposed in an oblique position relative to the faces of the front sprocket while being wound around the front sprocket and any of the rear sprockets. When the chain is disposed in an oblique position while being wound around the front sprocket and any of the rear sprockets, it is concerned that the chain may be disengaged from the front sprocket. In light of this concern, a conventional construction has been proposed for making the chain unlikely to be disengaged from the front sprocket. In this conventional construction, the front sprocket is configured to be movable in an axial direction arranged in parallel to a rotational center axis whereby the chain is unlikely to be disposed in an extremely oblique position.

For example, a crank assembly has been disclosed in U.S. Patent Application Publication No. 2013/0008282 that includes a slide mechanism configured to slide a front sprocket in an axial direction that is parallel to a rotational center axis of the front sprocket. The slide mechanism includes a plurality of support shafts mounted between a front sprocket and a crank arm to which the front sprocket is attached. Each support shaft extends through the front sprocket in the axial direction that is arranged in parallel to the rotational center axis. The front sprocket is supported by the support shafts while being movable relatively to the crank arm in the axial direction.

The crank assembly, described in the specification of U.S. Patent Application Publication No. 2013/0008282, is configured to axially move the front sprocket by the slide mechanism mounted between the front sprocket and the crank arm. With this conventional construction, it is concerned that foreign objects (e.g., mud, liquid, dirt and dust, etc.) will become attached to the slide mechanism, and thus, the slide mechanism is contaminated. With this conventional construction, contamination of the slide mechanism poses a possibility of difficulty in axial movement of the front sprocket.

SUMMARY

One object of the present invention is to prevent contamination of a slide mechanism attributed to foreign objects in a crank assembly in which a sprocket is configured to be axially movable.

A bicycle crank assembly according to the present invention includes a sprocket having a rotational center axis, a crank, a crank axle and a slide mechanism. The crank axle is attached to the crank and includes an internal space. The slide mechanism is configured to displace the sprocket relatively to the crank in an axial direction parallel to the rotational center axis. At least part of the slide mechanism is disposed in the internal space of the crank axle.

In the bicycle crank assembly, at least part of the slide mechanism is disposed in the internal space of the crank axle. With this construction, contamination of the slide mechanism attributed to foreign objects can be prevented.

The slide mechanism can include a slide shaft, at least part of which is configured to move along the rotational center axis in the internal space. According to this construction, at least part of the slide shaft is disposed in the internal space. Hence, contamination of the slide shaft attributed to foreign objects can be prevented. Moreover, the slide shaft, extending in the axial direction that is arranged in parallel to the rotational center axis, composes part of the slide mechanism. Hence, it is possible to provide the slide mechanism with high stiffness.

The slide mechanism can further include a slide member that is disposed between a radially inner peripheral surface of the crank axle and a radially outer peripheral surface of the slide shaft in the internal space of the crank axle. According to this construction, the slide member is disposed in the internal space. Hence, contamination of the slide member attributed to foreign objects can be further prevented.

The slide shaft can include a first end and a second end. The first end can be located inside the internal space of the crank axle while the second end can be located outside the internal space of the crank axle while the slide mechanism is attached to the crank axle. According to this construction, the first end is disposed in the internal space. Hence, contamination of the slide shaft attributed to foreign objects can be prevented.

The sprocket can be attached to the second end of the slide shaft. According to this construction, the second end is disposed outside the internal space of the crank axle. Hence, the sprocket can be easily coupled to the slide shaft.

The bicycle crank assembly can further include a first fixing bolt fixing the sprocket to the second end of the slide shaft. According to this construction, the sprocket can be detachably fixed to the second end of the slide shaft by the first fixing bolt.

The sprocket can be attached to the second end of the slide shaft through an adapter member. According to this construction, when the adapter member herein prepared is designed to be compatible for dimensions of various sprockets, the various sprockets are usable in the bicycle crank assembly according to the present invention.

The slide shaft can be press-fitted to the adapter member. According to this construction, the adapter member can be fixed to the slide shaft with a simple structure.

The slide shaft can be adhesively fixed to the adapter member. According to this construction, the slide shaft and the adapter member are fixed by adhesive. Hence, a fixation work for the slide shaft and the adapter member can be easily done.

The slide shaft can be diffusion bonded to the adapter member. According to this construction, the slide shaft and the adapter member can be firmly joined to each other.

The slide mechanism can further include a contact member attached to the first end of the slide shaft. According to this construction, a slide range of the slide shaft in the axial direction that is arranged in parallel to the rotational center axis (i.e., a slide range of the sprocket) is settable by the construction that the contact member makes contact with the crank axle.

The contact member can be adjustable in an axial position relative to the slide shaft. According to this construction, the slide range of the slide shaft in the axial direction that is arranged in parallel to the rotational center axis is adjustable by changing the axial position of the contact member.

The contact member can be threadedly engaged with the first end of the slide shaft. According to this construction, the slide range of the slide shaft in the axial direction that is arranged in parallel to the rotational center axis is easily adjustable in accordance with the amount of screwing the contact member.

The contact member can include a first contact part and a second contact part that is axially separated from the first contact part. According to this construction, a first maximum axial slide position in a separating direction of the sprocket from the crank axle is settable by one of the first and second contact parts, whereas a second maximum axial slide position in an approaching direction of the sprocket to the crank axle is settable by the other of the first and second contact parts. Thus, the slide range of the slide member is settable by the single contact member.

The first contact part can extend radially outwardly from an outer peripheral surface of the contact member. According to this construction, the first maximum axial slide position in the separating direction of the sprocket from the crank axle is easily settable.

The first contact part can circumferentially extend on the outer peripheral surface of the contact member. According to this construction, a contact area of the first contact part can be enlarged. Hence, surface pressure (load per unit area) acting on the first contact part can be lowered.

The slide mechanism can include a first cushioning member configured to make contact with the first contact part of the contact member. According to this construction, even when the first contact part makes contact with the first cushioning member, impact caused by this contact can be absorbed by the first cushioning member.

The slide mechanism can include a second cushioning member configured to make contact with the second contact part of the contact member. According to this construction, even when the second contact part makes contact with the second cushioning member, impact caused by this contact can be absorbed by the second cushioning member.

The crank can include a first crank arm and a second crank arm. The crank axle can include a first axle end and a second axle end, and the first crank arm can be fixed to the first axle end. According to this construction, one of the first and second crank arms is fixed to one axle end of the crank axle. Hence, the present bicycle crank assembly can be provided as one equipped with a slide mechanism having high stiffness.

The bicycle crank assembly can further include a second fixing bolt fixing the second crank arm to the second axle end. According to this construction, even when the first crank arm is integrally fixed to the first axle end of the crank axle, the second crank arm can be detachably fixed to the second axle end of the crank axle by the second fixing bolt.

The second cushioning member can be fixed to the second fixing bolt. According to this construction, the second cushioning member is easily attachable/detachable to/from the second fixing bolt. Moreover, when the second crank arm is attached to the crank axle by the second fixing bolt, the second cushioning member can be simultaneously attached to the crank axle.

The second cushioning member can include an attachment part and a cushioning part. The attachment part can be attached to the second fixing bolt. The cushioning part can axially extend from the attachment part. According to this construction, the second cushioning member is attached to the second fixing bolt through the attachment part. Hence, the second cushioning member is easily attachable/detachable to/from the second fixing bolt.

The second cushioning member can be adjustable in an axial position relative to the second fixing bolt. According to this construction, the second maximum axial slide position in the approaching direction of the sprocket to the crank axle is adjustable. Hence, the slide range is easily adjustable.

The second cushioning member can be screwed to the second fixing bolt. According to this construction, the second maximum axial slide position in the approaching direction of the sprocket to the crank axle is easily settable in accordance with the amount of screwing the second cushioning member.

The first axle end can be press-fitted to the first crank arm. According to this construction, a structure for fixing the first crank arm can be simplified.

The first axle end can be adhesively fixed to the first crank arm. According to this construction, a work to fix the first crank arm can be easily done.

The first axle end can be diffusion bonded to the first crank arm. According to this construction, the first axle end and the first crank arm can be firmly joined to each other.

The slide member can include at least one rolling element. According to this construction, slide resistance of the slide member can be reduced by the at least one rolling element, and the slide shaft can be thereby smoothly moved in the axial direction.

The slide member can include a plurality of rolling elements. The slide mechanism can include a supporting member. The supporting member is configured to restrict positions of the rolling elements. According to this construction, the rolling elements, even when used for reducing the slide resistance, are smoothly movable while their positions are restricted.

The slide member can include a rolling element and at least one slide element. According to this construction, the slide shaft is supported not only by the rolling element but also by the at least one slide element. Hence, the slide mechanism can be enhanced in stiffness. Consequently, even in a situation that a large load is applied, the slide shaft can be smoothly moved in the axial direction.

The at least one slide element can include a first slide element and a second slide element. The rolling element can be located between the first slide element and the second slide element in the axial direction. According to this construction, the slide shaft is supported at three positions, i.e., the rolling element and the both sides of the rolling element in the axial direction. Hence, the slide mechanism can be effectively enhanced in stiffness.

The at least one slide element can include a solid lubricant. According to this construction, addition of liquid lubricant is not required. Hence, maintenance of the slide mechanism can be easily done.

The slide member can include a slide element. According to this construction, the slide element composes part of the slide member. Hence, the slide mechanism can be simply constructed.

The slide element can include a solid lubricant. According to this construction, addition of liquid lubricant is not required. Hence, maintenance of the slide mechanism can be easily done.

The sprocket can include at least one first tooth and at least one second tooth. The at least one first tooth has a first chain engaging width. The first chain engaging width is less than an outer link space between a pair of opposed outer links of a bicycle chain, and is greater than an inner link space between a pair of opposed inner links of the bicycle chain. The at least one second tooth has a second chain engaging width. The second chain engaging width is less than inner link space. According to this construction, the at least one first tooth is meshed with the outer links of the chain, while the at least one second tooth is meshed with the inner links of the bicycle chain. Hence, the chain is unlikely to be disengaged from the sprocket.

The at least one first tooth and the at least one second tooth can be alternately disposed in a circumferential direction of the sprocket. According to this construction, the outer links and the inner links of the bicycle chain, which are alternately disposed, can be reliably meshed with the at least one first tooth and the at least one second tooth.

The at least one first tooth can have a first tooth tip and the at least one second tooth can have a second tooth tip. At least one of the first tooth tip and the second tooth tip being axially inwardly offset from an axial center plane of the sprocket. According to this construction, the bicycle chain is unlikely to be disposed in an excessively oblique position even when a bicycle frame is of a type to which a rear sprocket assembly is mounted in a relatively inward position.

The at least one first tooth can have a first tooth tip and the at least one second tooth can have a second tooth tip. At least one of the first tooth tip and the second tooth tip being axially outwardly offset from an axial center plane of the sprocket. According to this construction, the bicycle chain is unlikely to be disposed in an excessively oblique position even when the bicycle frame is of a type to which the rear sprocket assembly is mounted in a relatively outward position.

Overall, according to the present invention, contamination of the slide mechanism attributed to foreign objects can be prevented in the crank assembly in which the sprocket is configured to be axially movable.

BRIEF DESCRIPTION OF THE DRAWINGS

Referring now to the attached drawings which form a part of this original disclosure.

DETAILED DESCRIPTION OF EMBODIMENTS

Figure 1:
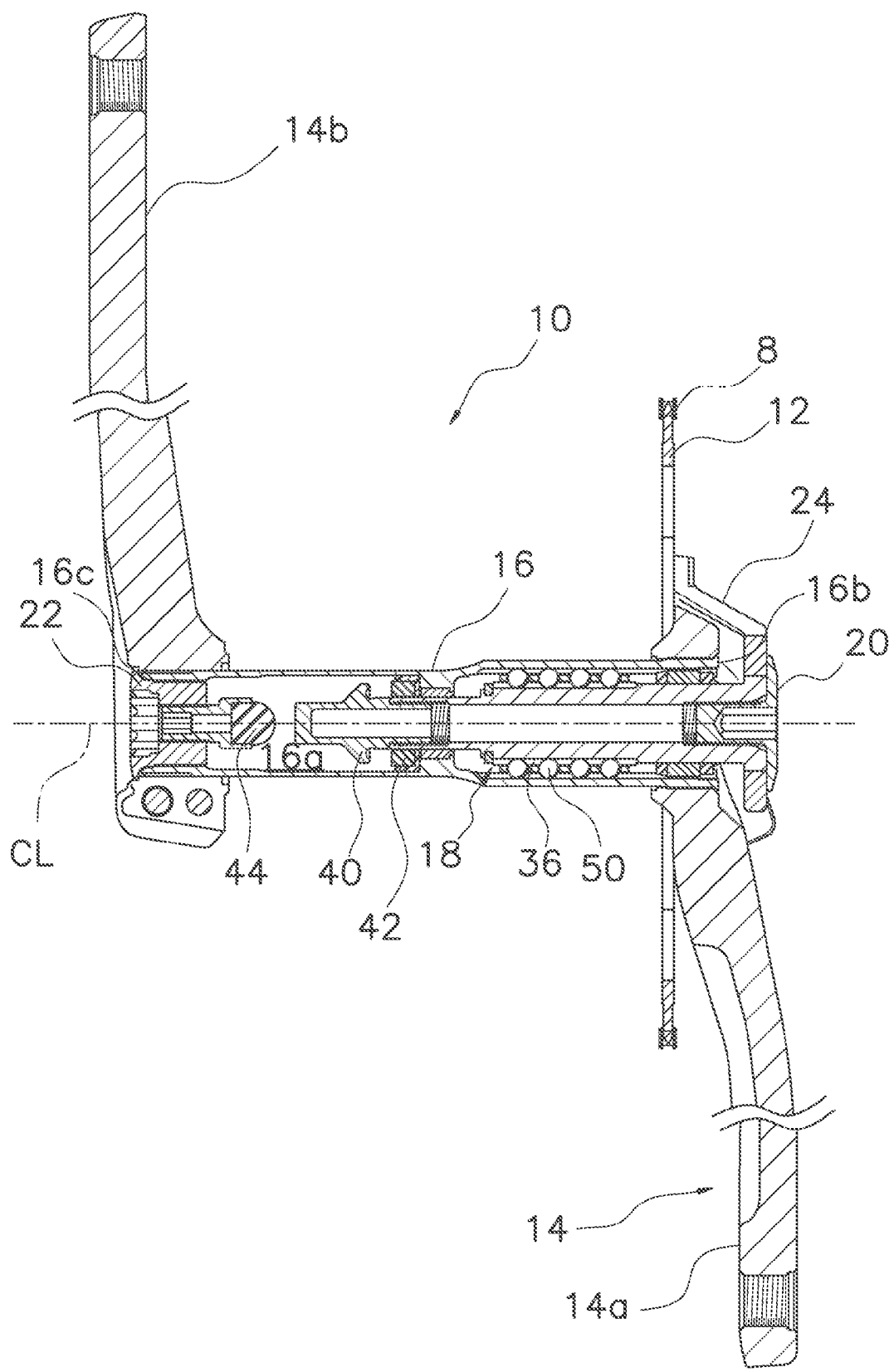
FIG. 1 is a cross-sectional view of a bicycle crank assembly according to an exemplary embodiment.
Figure 2:
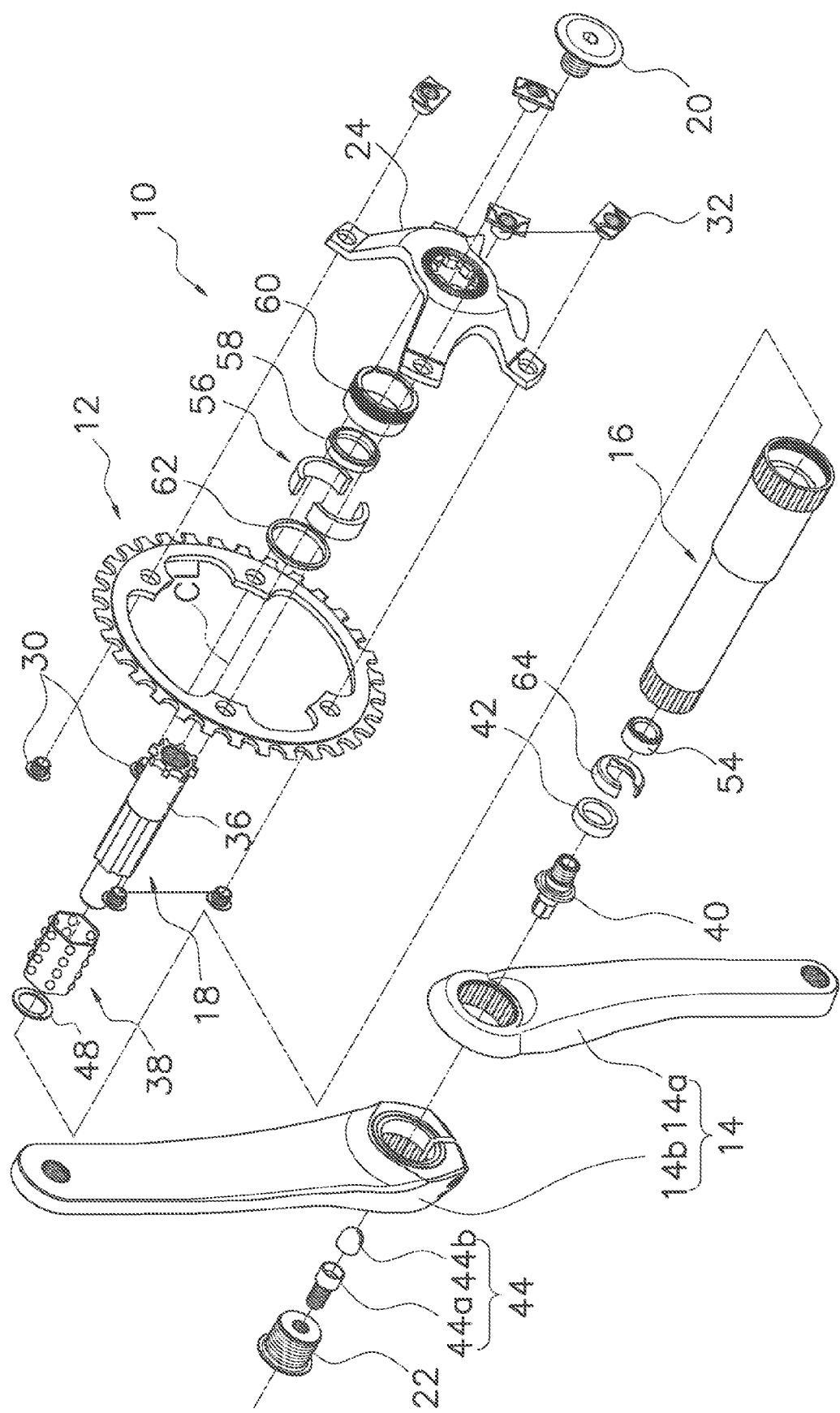
FIG. 2 is an exploded perspective view of the bicycle crank assembly illustrated in FIG. 1.

As shown in FIGS. 1 and 2, a bicycle crank assembly 10 according to an exemplary embodiment. Basically, the bicycle crank assembly 10 includes a sprocket 12 having a rotational center axis CL, a crank 14, a crank axle 16, a slide mechanism 18, a first fixing bolt 20, a second fixing bolt 22 and an adapter member 24.

Figure 3:
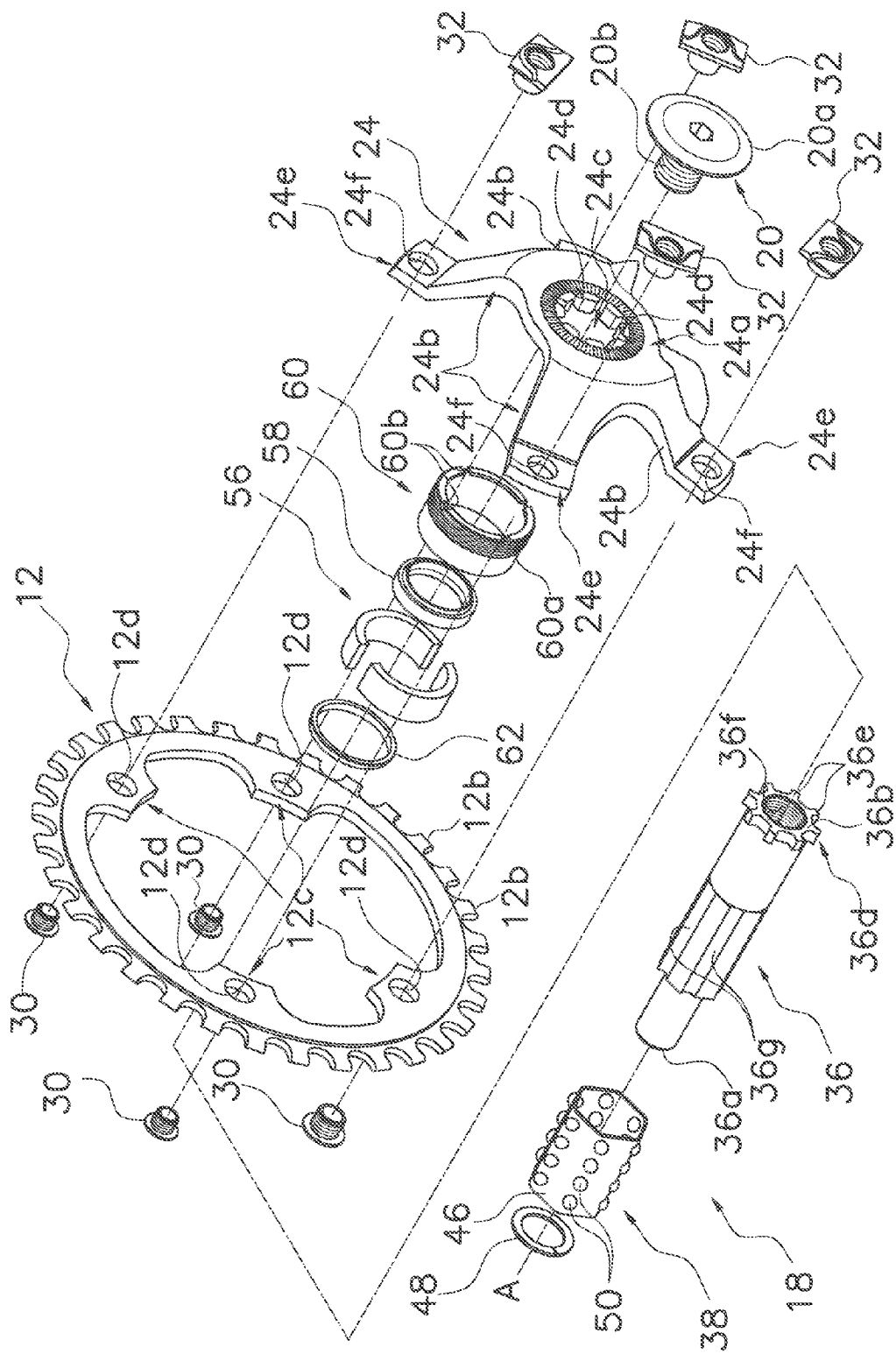
FIG. 3 is an enlarged exploded perspective view of a sprocket-side part of the bicycle crank assembly illustrated in FIG. 1.

The sprocket 12 is coupled to the slide mechanism 18 through the adapter member 24. As shown in FIG. 3, the sprocket 12 includes a plurality of teeth 12b on its outer peripheral part. The teeth 12b are configured to be meshed with a bicycle chain 8. It should be noted that FIG. 3 depicts a large number of teeth 12b, and therefore, part of the teeth 12b is denoted by the reference sign 12b. The sprocket 12 includes a plurality of (preferably, three to five) joint parts 12c on its inner peripheral part. The joint parts 12c are configured to be joined to the adapter member 24. In the present exemplary embodiment, the number of the joint parts 12c is four. The joint parts 12c protrude radially inward toward the rotational center axis CL. The joint parts 12c are respectively provided with joint holes 12d. The joint holes 12d are holes to which a plurality of joint bolts 30 and a plurality of joint nuts 32 to be screwed onto the joint bolts 20 are attachable (see FIG. 3).

Figure 4:
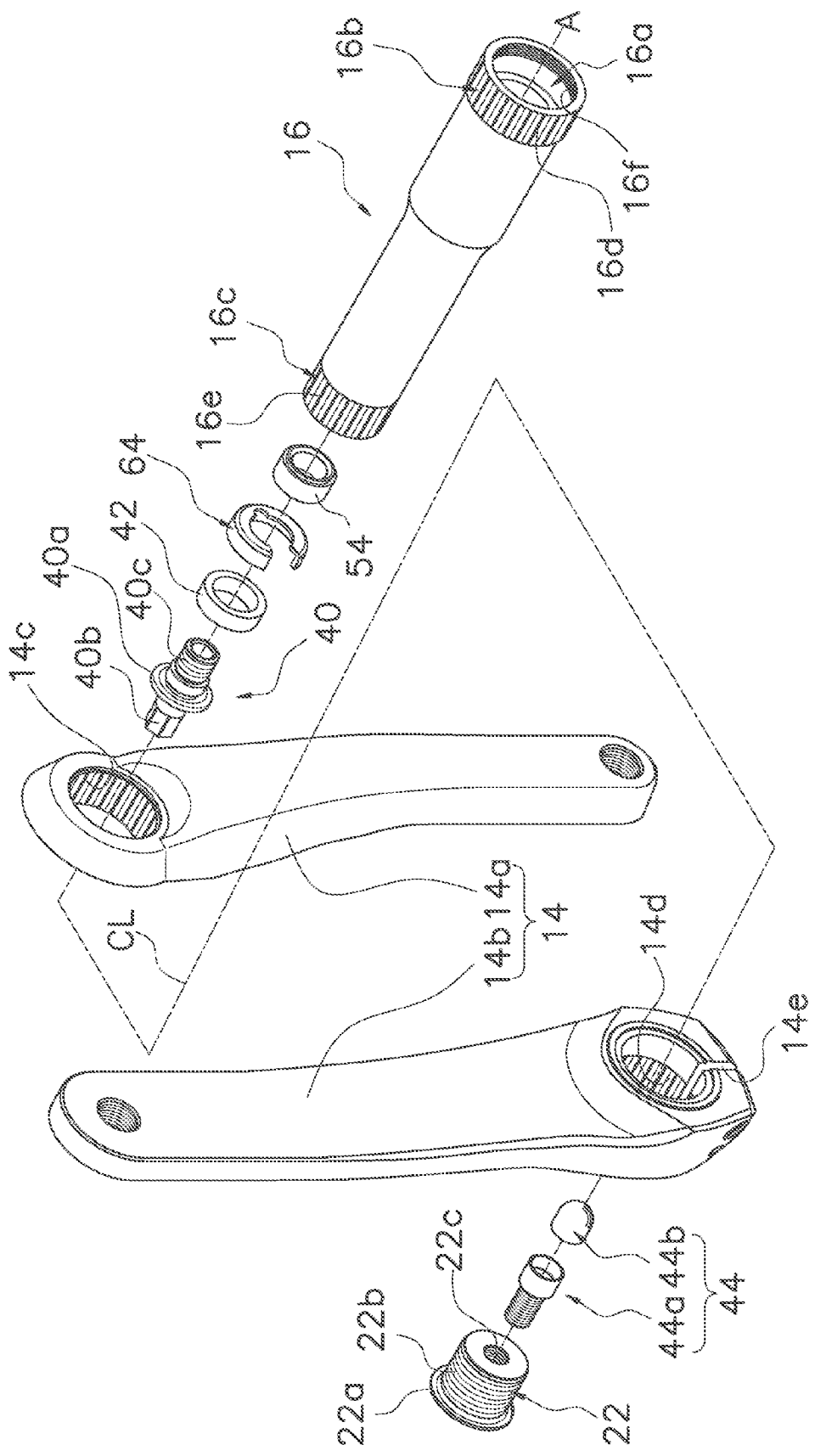
FIG. 4 is an enlarged exploded perspective view of a second crank arm-side part of the bicycle crank assembly illustrated in FIG. 1.
Figure 5:
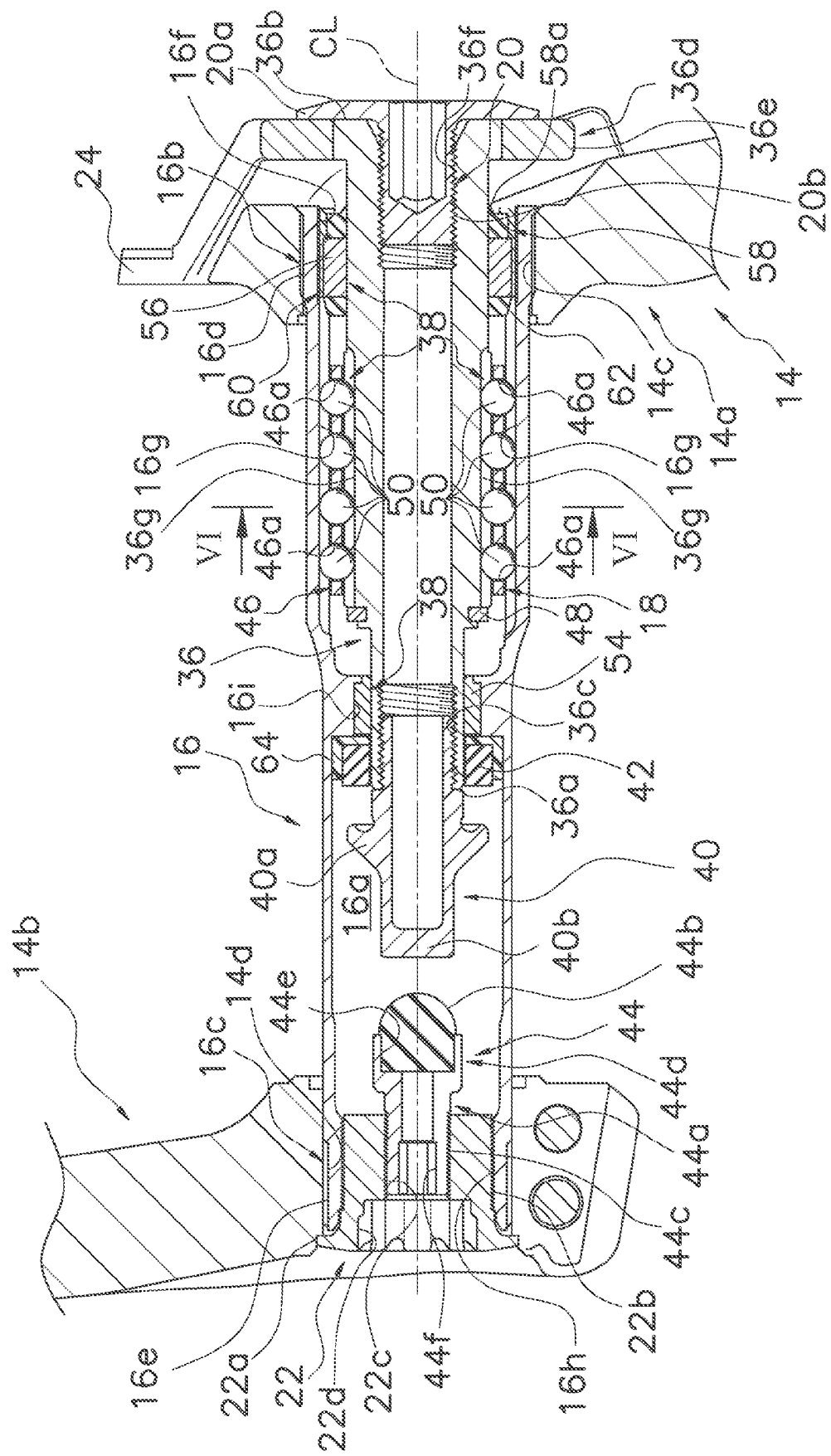
FIG. 5 is an enlarged cross-sectional view of the bicycle crank assembly illustrated in FIG. 1.

As shown in FIGS. 4 and 5, the crank 14 includes a first crank arm 14a and a second crank arm 14b. The first and second crank arms 14a and 14b radially extend from the crank axle 16. The first crank arm 14a includes a first fixation hole 14c in its base end. The first fixation hole 14c is provided with serrations to be fixed onto the crank axle 16. The first fixation hole 14c is fixed to the crank axle 16 by, for instance, any of the methods including press-fitting, adhesive and diffusion bonding. The second crank arm 14b includes a second fixation hole 14d in its base end. The second fixation hole 14d is provided with serrations to be fixed onto the crank axle 16. The second crank arm 14b is detachably fixed at the surroundings of the second fixation hole 14d to the crank axle 16 by the second fixing bolt 22. The second crank arm 14b includes a slit 14e in its base end. The gap of the slit 14e is configured to be narrowed by one or two bolt members (not shown in the drawings).

The crank axle 16 is a hollow tubular member. The crank axle 16 is attached to the crank 14. The crank axle 16 includes an internal space 16a, a first axle end 16b and a second axle end 16c. When seen from behind in a traveling direction of a bicycle, the first axle end 16b is disposed on the right side in a condition that the crank axle 16 is attached to the bicycle. The first crank arm 14a is fixed to the first axle end 16b while being unitarily rotatable therewith. The first axle end 16b is press-fitted to the first crank arm 14a. The first axle end 16b can be fixed to the first crank arm 14a other than by press-fitting. For example, the first axle end 16b can be adhesively fixed to the first crank arm 14a or diffusion bonded to the first crank arm 14a. The second crank arm 14b is detachably fixed to the second axle end 16c while being unitarily rotatable therewith. In the crank axle 16, the first axle end 16b has a larger diameter than the second axle end 16c. The first axle end 16b of the crank axle 16 is provided with a first serration part 16d on its outer peripheral surface. The first serration part 16d is provided for fixing the first crank arm 14a to the crank axle 16 in a unitarily rotatable state. The second axle end 16c of the crank axle 16 is provided with a second serration part 16e on its outer peripheral surface. The second serration part 16e is provided for detachably joining the second crank arm 14b to the crank axle 16 in a unitarily rotatable state. Additionally, the first axle end 16b of the crank axle 16 is provided with a first female threaded part 16f and a plurality of (preferably, three to nine) first guide grooves 16g (see FIG. 6) on its inner peripheral surface. The first female threaded part 16f is provided about the rotational center axis CL. The first guide grooves 16g extend in parallel to the rotational center axis CL. In the present exemplary embodiment, the number of the first guide grooves 16g is six. Each of the first guide grooves 16g has a cross-section having a circular-arc shape. The first guide grooves 16g are provided for axially guiding the slide mechanism 18. Each of the first guide grooves 16g recesses in a circular-arc shape. The first guide grooves 16g are disposed on the inner peripheral surface of the crank axle 16 while being circumferentially aligned at intervals. As shown in FIG. 5, the second axle end 16c of the crank axle 16 is provided with a second female threaded part 16h on its inner peripheral surface. The second female threaded part 16h is provided about the rotational center axis CL. The second fixing bolt 22 is screwed into the second female threaded part 16h in order to fix the second crank arm 14b to the second axle end 16c. Moreover, an intermediate part of the crank axle 16 is provided with a step 16i on its inner peripheral surface. The step 16i has a smaller diameter than the inner peripheral surface of the intermediate part of the crank axle 16.

The slide mechanism 18 is configured to displace the sprocket 12 relatively to the crank 14 in an axial direction parallel to the rotational center axis CL. Additionally, the slide mechanism 18 is configured to transmit rotation of the crank axle 16 to the sprocket 12. At least part of the slide mechanism 18 is disposed in the internal space 16a of the crank axle 16. The slide mechanism 18 includes a slide shaft 36, a slide member 38, a contact member 40, a first cushioning member 42, a second cushioning member 44 and a retainer member 46.

The slide shaft 36 is a hollow shaft member. At least part of the slide shaft 36 is configured to move in the internal space 16a along the rotational center axis CL. The slide shaft 36 includes a first end 36a and a second end 36b. In a condition that the slide mechanism 18 is attached to the crank axle 16, the first end 36a is located inside the internal space 16a of the crank axle 16 whereas the second end 36b is located outside the internal space 16a of the crank axle 16. Specifically, the second end 36b is disposed while protruding from the first axle end 16b of the crank axle 16. The sprocket 12 is attached to the second end 36b of the slide shaft 36. In the present exemplary embodiment, the sprocket 12 is attached to the second end 36b of the slide shaft 36 by the first fixing bolt 20. Moreover, in the present exemplary embodiment, the sprocket 12 is attached to the second end 36b of the slide shaft 36 through the adapter member 24. The slide shaft 36 is fixed to the adapter member 24 by any of the methods including press-fitting, adhesive and diffusion bonding. In other words, the slide shaft 36 can be press-fitted to the adapter member 24, adhesively fixed to the adapter member 24 or diffusion bonded to the adapter member 24.

The first end 36a-side part of the slide shaft 36 has a smaller diameter than the second end 36b-side part thereof. The first end 36a is provided with a third female threaded part 36c on its inner peripheral surface. The third female threaded part 36c is provided for attaching the contact member 40 to the slide shaft 36. The second end 36b is provided with a joint fixation part 36d on its outer peripheral surface. The joint fixation part 36d is provided for joining and fixing the sprocket 12 to the slide shaft 36 through the adapter member 24 in a unitarily rotatable state. The joint fixation part 36d includes a plurality of (preferably, four to ten) protrusions 36e that radially protrude therefrom. In the present exemplary embodiment, the number of the protrusions 36e is eight. The joint fixation part 36d is preferably fixed to the adapter member 24 by press-fitting. The second end 36b of the slide shaft 36 is provided with a fourth female threaded part 36f on its inner peripheral surface. The fourth female threaded part 36f is provided for fixing the adapter member 24 to the slide shaft 36 by the first fixing bolt 20.

Figure 6:
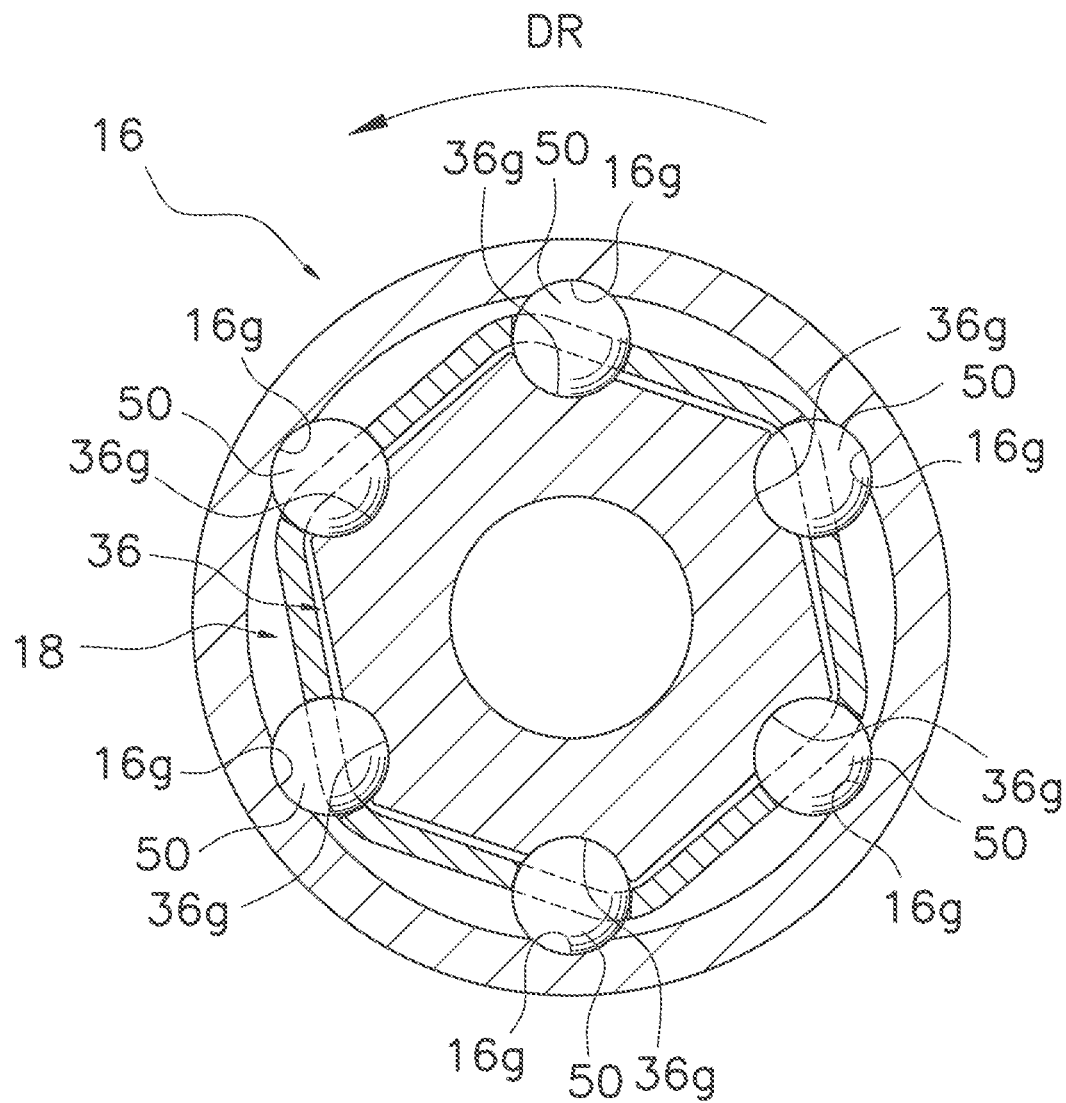
FIG. 6 is a transverse cross-sectional view of the bicycle crank assembly illustrated in FIG. 1 as taken along section line VI-VI of FIG. 5.

As shown in FIGS. 3 and 6, the axially intermediate part of the slide shaft 36 has a cross-section having an approximately hexagonal shape. The hexagonal part is provided with a plurality of (preferably, three to nine) second guide grooves 36g for axially guiding at least one rolling element 50 (to be described) of the slide member 38. The intermediate part of the slide shaft 36 has a larger contour than a circular part of the second end 36b. The second guide grooves 36g are provided to extend in parallel to the rotational center axis CL. The second guide grooves 36g are disposed on the inner peripheral side of the first guide grooves 16g, while being opposable to the first guide grooves 16g in the radial direction about the rotational center axis CL. Each second guide groove 36g is preferably provided on each of six sides of the hexagonal contour, and is located in the vicinity of a downstream one of the both corners of each side in a drive rotational direction DR. With this construction, when a load is applied in transmitting rotation of the crank axle 16 in the drive rotational direction DR, the rolling elements 50 can receive the load while each rolling element 50 makes contact with each second guide groove 36g in a large area.

The slide member 38 is located radially between the inner peripheral surface of the crank axle 16 and the outer peripheral surface of the slide shaft 36 in the internal space 16a of the crank axle 16. The slide member 38 includes at least one rolling element 50. In the present exemplary embodiment, the slide member 38 includes a plurality of (preferably 24) rolling elements 50. The number of the rolling elements 50 is not limited to 24, and can be arbitrarily set as long as it is greater than or equal to six. The positions of the plurality of rolling elements 50 are restricted by the retainer member 46. The retainer member 46 is disposed on the intermediate part of the slide shaft 36 while being disposed on the inner peripheral side of the crank axle 16. In the present exemplary embodiment, the retainer member 46 has a hexagonal tubular shape, and is provided with four holding holes 46a on each of the six sides of its hexagonal contour. The holding holes 46a are disposed at internals in a parallel direction to the rotational center axis CL. The rolling elements 50 are respectively held by the holding holes 46a in a rollable state. The rolling elements 50 are configured to roll within the first guide grooves 16g and the second guide grooves 36g while being guided by the first guide grooves 16g and the second guide grooves 36g. The retainer member 46 is restricted from moving toward the first end 36a by a retainer ring 48 mounted to the slide shaft 36.

The slide member 38 can include the rolling elements 50 and slide elements. In the present invention, the slide elements include, for instance, a tubular sliding bearing. Each of the slide elements can preferably include a solid lubricant. In the present exemplary embodiment, the slide member 38 further includes a first slide element 54 and a second slide element 56. The plurality of rolling elements 50 are located between the first slide element 54 and the second slide element 56 in the axial direction. The first slide element 54 is mounted to the step 16i, and supports a small-diameter part of the slide shaft 36 such that the small-diameter part is slidable. The second slide element 56 is disposed on the second end 36b-side part of the slide shaft 36. The second slide element 56 is mounted to a first mount member 60. The first mount member 60 has a tubular shape, and is screwed into the first female threaded part 16f of the crank axle 16. The first mount member 60 includes a male threaded part 60a and tool lock parts 60b on its outer peripheral surface. The male threaded part 60a is screwed into the first female threaded part 16f. The tool lock parts 60b are provided orthogonally to an end surface of the first mount member 60, i.e., an end surface located on the same side as the first axle end 16b of the crank axle 16.

The second slide element 56 supports the second end 36b-side part of the slide shaft 36 such that the second end 36b-side part is slidable. Each of the first and second slide elements 54 and 56 can preferably include a solid lubricant. The second slide element 56 is divided into two semicircular halves. This is because the contour of the intermediate part of the slide shaft 36 is larger than that of the second end 36b-side circular part. A seal member 58 is mounted to the first mount member 60 while being located adjacently to the second slide element 56. The seal member 58 has a lip 58a on its end located on the second end 36b side. The seal member 58 is provided for preventing intrusion of liquid or foreign objects into the internal space 16a of the crank axle 16. A restriction member 62, made of an elastic body, is disposed on the first end 36a-side end surface of the second slide element 56. The outer peripheral surface of the restriction member 62 is tapered, and makes contact with a taper surface provided on the inner peripheral surface of the crank axle 16 whereby axial movement of the second slide element 56 is restricted.

The contact member 40 is preferably made of metal, and is attached to the first end 36a of the slide shaft 36. The contact member 40 is provided for setting an axial slide range of the slide shaft 36, i.e., a moving range of the sprocket 12. The contact member 40 includes a first contact part 40a, a second contact part 40b axially separated from the first contact part 40a, and a male threaded part 40c. The first contact part 40a is disposed between the second contact part 40b and the male threaded part 40c. The first contact part 40a has a brim shape and extends radially outwardly from the outer peripheral surface of the contact member 40 while extending circumferentially on the outer peripheral surface of the contact member 40. The first contact part 40a is configured to make contact with the first cushioning member 42. The male threaded part 40c is screwed into the third female threaded part 36c provided on the inner peripheral surface of the first end 36a of the slide shaft 36. The contact member 40 is screwed into the slide shaft 36. Hence, it is possible to adjust the axial position of the contact member 40 relative to the slide shaft 36 by changing the amount of screwing the contact member 40. The second contact part 40b is implemented by the second crank arm 14b-side end surface of the contact member 40. The second contact part 40b preferably has a hexagonal cross-section whereby a tool (preferably, a hex socket) can be engaged with the second contact part 40b in screwing the contact member 40 into the third female threaded part 36c. The second contact part 40b is configured to make contact with the second cushioning member 44.

Preferably, the first cushioning member 42 is a ring-shaped member made of an elastic body (e.g., synthetic rubber) and is settable to face the first contact part 40a. The first cushioning member 42 is mounted to the inner peripheral part of a second mount member 64. The second mount member 64 is disposed in alignment with the first slide element 54 in the axial direction that is arranged in parallel to the rotational center axis CL. The second mount member 64 is a C-shaped member made of a synthetic resin elastic body. The second mount member 64 has an outer peripheral surface with a larger diameter than the inner peripheral surface of the crank axle 16. The second mount member 64 is held against the inner peripheral surface of the crank axle 16 by its elasticity.

The second cushioning member 44 is a member made of an elastic body (e.g., synthetic rubber) and is designed to be attached to the second fixing bolt 22. The second cushioning member 44 includes an attachment part 44a and a cushioning part 44b. The attachment part 44a includes a male threaded part 44c and a mount part 44d. The male threaded part 44c is attached to the second fixing bolt 22. The mount part 44d has a larger diameter than the male threaded part 44c. The mount part 44d is provided with a circular recess 44e to which the cushioning part 44b is mounted. The attachment part 44a is provided with, for instance, a tool lock part 44f on its end located on the same side as the second axle end 16c. The tool lock part 44f is engaged with a hex key for rotating the attachment part 44a to change the axial position of the attachment part 44a.

The cushioning part 44b axially extends from the attachment part 44a and is disposed in opposition to the second contact part 40b. The cushioning part 44b is a member made of an elastic body (e.g., synthetic rubber) and has a semi-spherical tip. The cushioning part 44b is fixed to the mount part 44d by any suitable fixing method (e.g., adhesive, integral molding, elastic engagement, etc.). The second cushioning member 44 is screwed into the second fixing bolt 22. Hence, it is possible to adjust the axial position of the second cushioning member 44 relative to the second fixing bolt 22 by changing the amount of screwing the second cushioning member 44.

As described above, the first fixing bolt 20 has a male threaded part 20b in order to fix the adapter member 24 to the slide shaft 36. The male threaded part 20b is screwed into the fourth female threaded part 36f of the slide shaft 36. The first fixing bolt 20 includes a flange part 20a contactable to the adapter member 24.

The second fixing bolt 22 includes a flange 22a, a male threaded part 22b and a screw hole 22c. The flange 22a makes contact with the second crank arm 14b. The male threaded part 22b is screwed into the second female threaded part 16h. The screw hole 22c is a hole into which the second cushioning member 44 is screwed. The second fixing bolt 22 is provided with a tool lock part 22d in the vicinity of the flange 22a. The tool lock part 22d is made in the shape of, for instance, an octagon. Preferably, the screw hole 22c is shaped to penetrate the second fixing bolt 22. With this construction, the tool lock part 44f of the attachment part 44a of the second cushioning member 44 can be turned by a tool (a hex key, etc.) from the outside of the second fixing bolt 22. Accordingly, a work for adjusting the slide range can be performed without disassembling the bicycle crank assembly 10. It should be noted that either the tool lock part 22d or the screw hole 22c of the second fixing bolt 22 can be covered with a detachable cap made of an elastic body. With this construction, liquid and foreign objects are unlikely to intrude into the internal space 16a of the crank axle 16 through the screw hole 22c.

The adapter member 24 includes a fixation part 24a and a plurality of (preferably, three to five) arms 24b. The fixation part 24a is fixed to the slide shaft 36 by the first fixing bolt 20. The arms 24b radially extend from the fixation part 24a. The fixation part 24a is provided with an engagement hole 24c. The engagement hole 24c is engaged with and press-fitted to the joint fixation part 36d of the slide shaft 36 while being unitarily rotatable therewith. The engagement hole 24c is provided with a plurality of (preferably, three to eight) recesses 24d with which the protrusions 36e are engaged. In the present exemplary embodiment, the number of the recesses 24d is six. The arms 24b include sprocket fixation parts 24e on their tips in order to fix the sprocket 12 thereto. The sprocket fixation parts 24e are shaped to face the joint holes 12d in the axial direction that is arranged in parallel to the rotational center axis CL. The sprocket 12 is fixed to the adapter member 24 by inserting the joint bolts 30 through the joint holes 12d and further screwing the joint bolts 30 into the joint nuts 32 that are non-rotatably engaged with the sprocket fixation parts 24e.

Action of Crank Assembly

Figure 7:
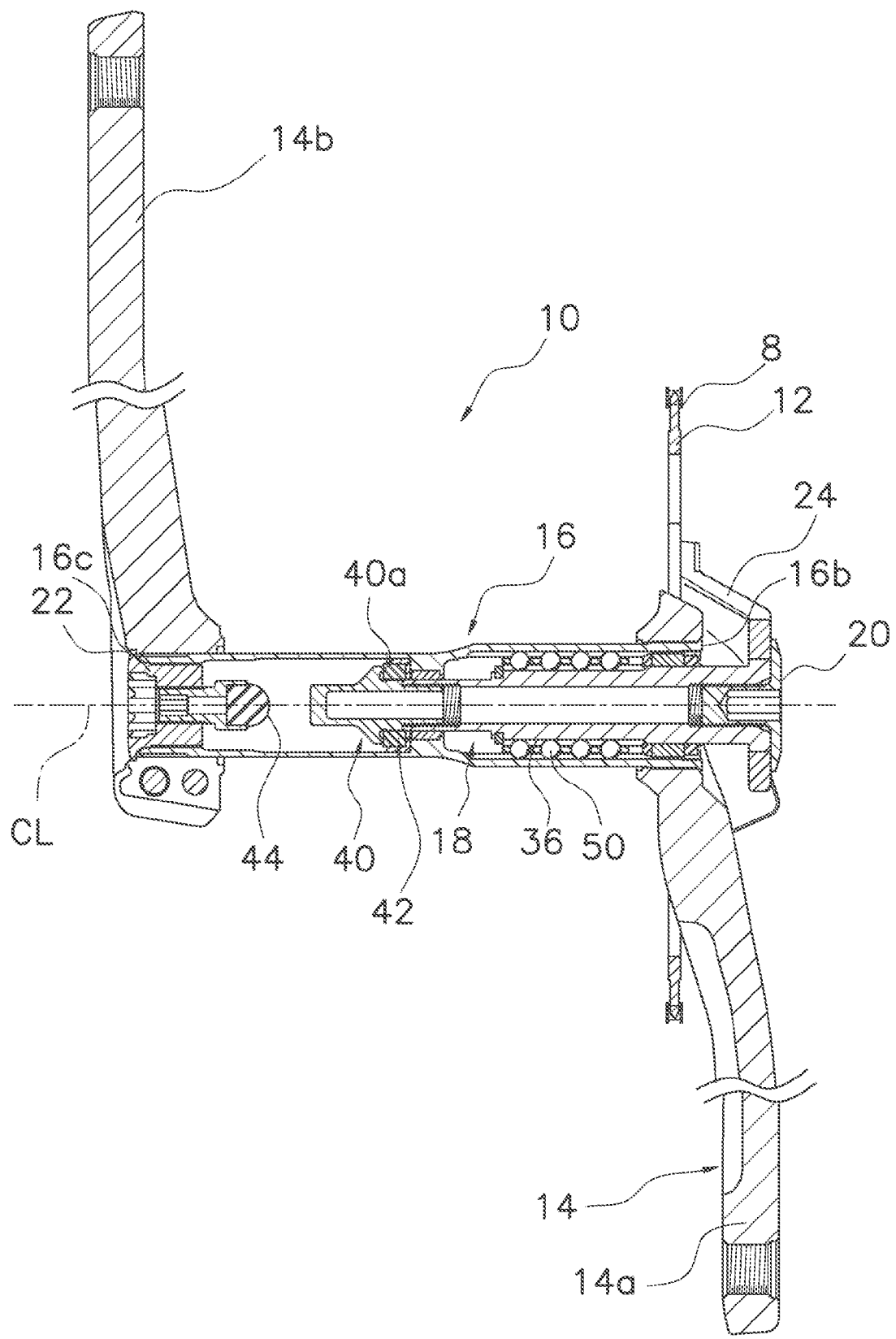
FIG. 7 is a cross-sectional view of the bicycle crank assembly illustrated in FIG. 1 shown in a condition in which a slide shaft is located in a first maximum axial slide position and corresponds to FIG. 1.
Figure 8:
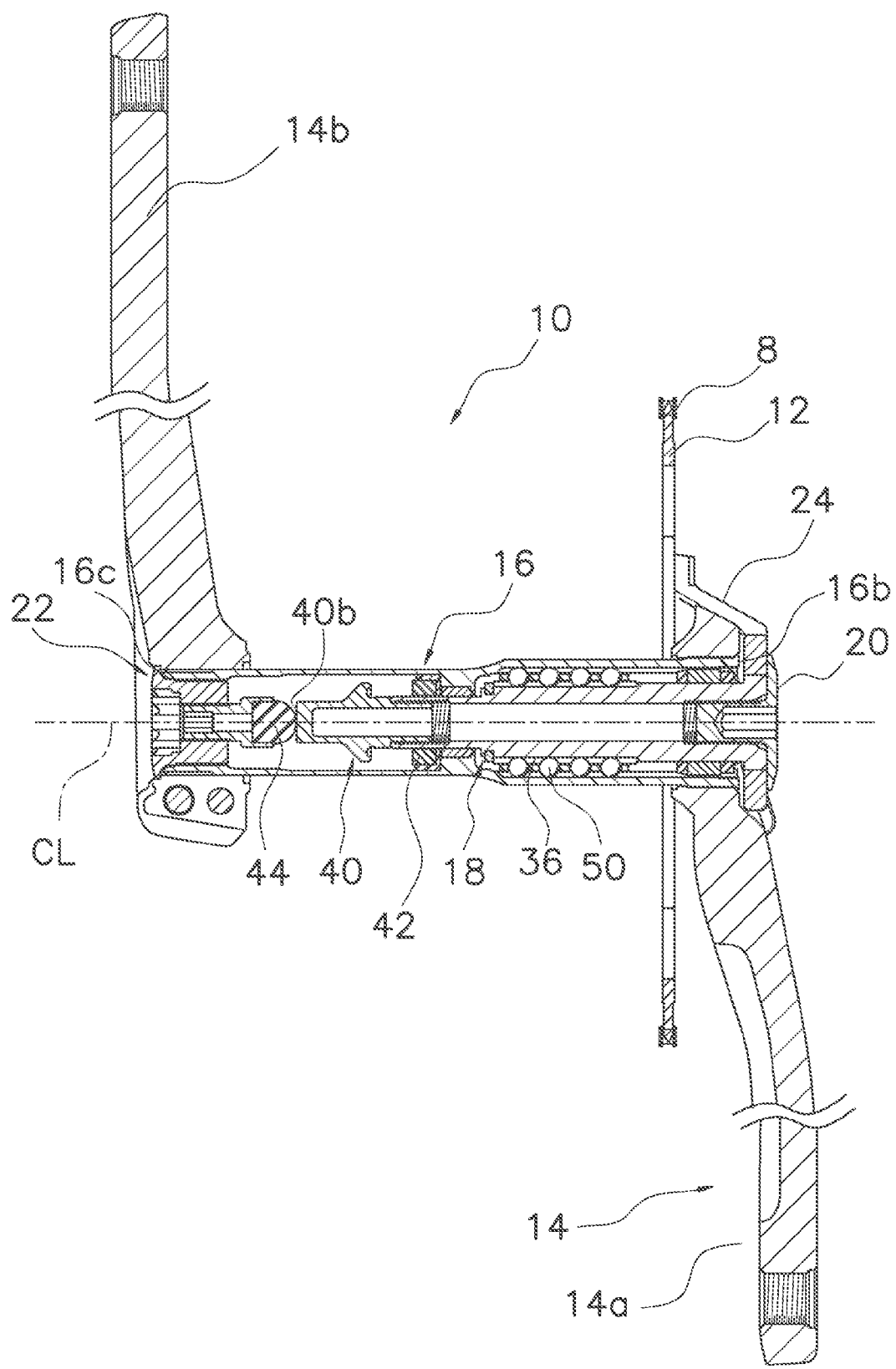
FIG. 8 is a cross-sectional view of the bicycle crank assembly illustrated in FIG. 1 shown in a condition in which the slide shaft is located in a second maximum axial slide position and corresponds to FIG. 1.

When the bicycle crank assembly 10 is mounted to a bicycle equipped with a rear derailleur and a plurality of rear sprockets with different numbers of teeth, the sprocket 12 is configured to be axially moved by the tension acting on the bicycle chain 8 and a gear shifting operation. Specifically, the sprocket 12 is configured to be moved between a first maximum axial slide position shown in FIG. 7 and a second maximum axial slide position shown in FIG. 8 by the tension and the gear shifting operation. The first maximum axial slide position is a position of the sprocket 12 moved in a separating direction from the crank axle 16, whereas the second maximum axial slide position is a position of the sprocket 12 moved in an approaching direction to the crank axle 16. The first maximum axial slide position is the first axle end 16b-side limit of the slide range, and in this position, the first contact part 40a of the contact member 40 is configured to make contact with the first cushioning member 42. The second maximum axial slide position is the second axle end 16c-side limit of the slide range, and in this position, the second contact part 40b of the contact member 40 is configured to make contact with the second cushioning member 44.

The first maximum axial slide position is adjustable by changing the screwed position of the contact member 40. The first maximum axial slide position is configured to be shifted in an approaching direction to the first axle end 16b by rotating the contact member 40 from the condition shown in FIG. 7 in an unscrewing direction. It should be noted that when the screwed position of the contact member 40 is changed, the second maximum axial slide position as well as the first maximum axial slide position is configured to be shifted without substantially changing the slide range.

The second maximum axial slide position is adjustable by changing the screwed position of the second cushioning member 44. The second maximum axial slide position is configured to be shifted in a separating direction from the second axle end 16c by rotating the second cushioning member 44 from the condition shown in FIG. 8 in an unscrewing direction. It should be noted that when the screwed position of the second cushioning member 44 is changed, only the second maximum axial slide position is changed, and accordingly, the slide range is changed.

First Modification

It should be noted that in the following explanation, a reference sign to be assigned to a given member is the same as that assigned to its relevant member of the aforementioned exemplary embodiment. However, when a given member is constructed differently from its relevant member of the aforementioned exemplary embodiment, a three-digit reference sign is assigned to the given member. The three-digit reference sign is herein produced by adding the hundreds digit to the reference sign assigned to the relevant member of the aforementioned exemplary embodiment.

Figure 9:
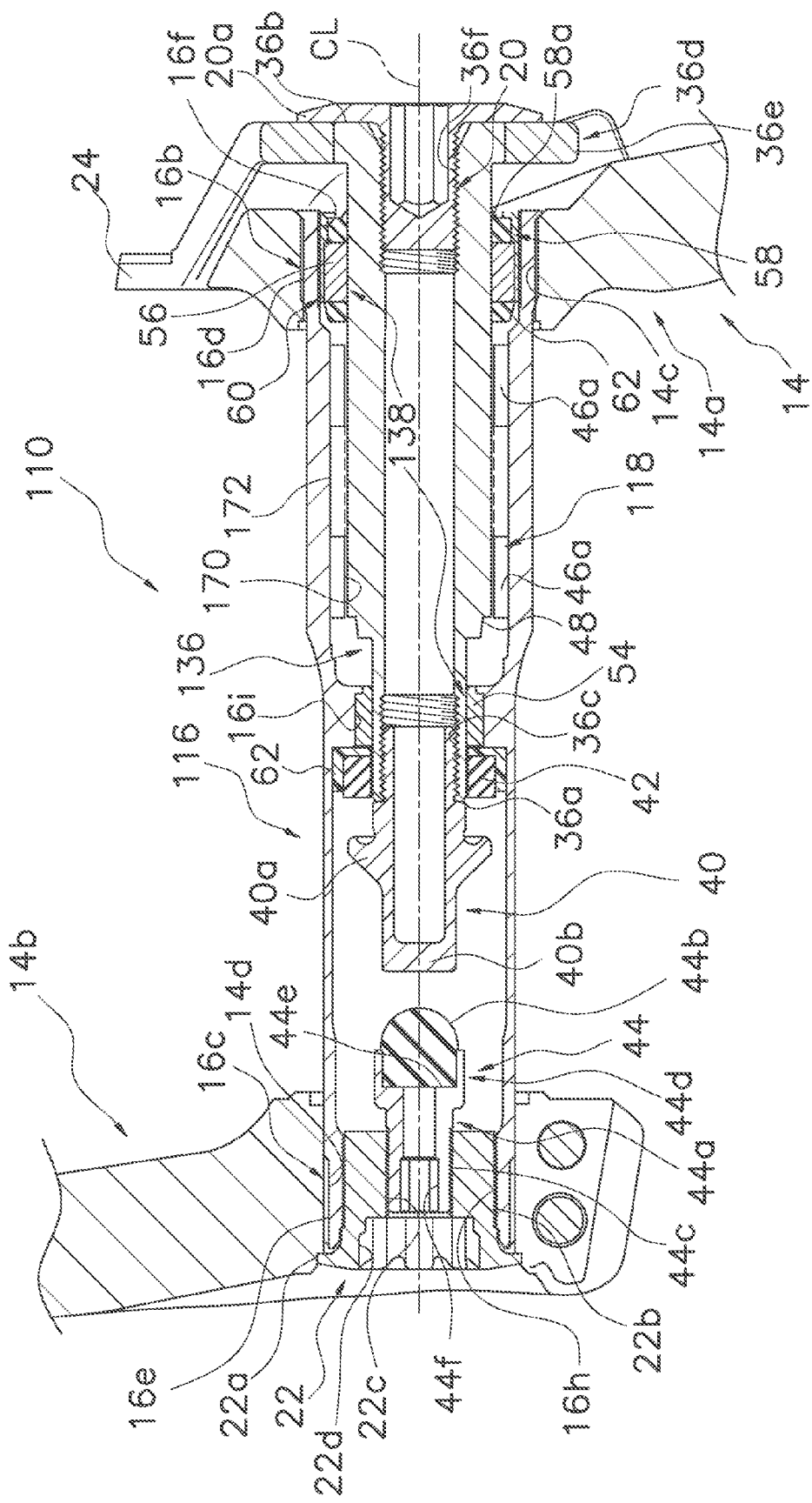
FIG. 9 is a cross-sectional view, corresponds to FIG. 6, of a portion of a bicycle crank assembly having a slide mechanism according to a first modification.

In a first modification, as shown in FIG. 9, a slide mechanism 118 of a bicycle crank assembly 110 includes a slide member 138 that is not provided with the rolling elements 50. The slide member 138 includes the first and second slide elements 54 and 56 employed in the aforementioned exemplary embodiment. Additionally, the slide mechanism 118 includes an internal tooth part 170 and an external tooth part 172 meshed with the internal tooth part 170. The internal tooth part 170 is integrally or separately provided on the inner peripheral surface of a crank axle 116, and is made in the shape of, for instance, internal splines. The external tooth part 172 is integrally or separately provided on the outer peripheral surface of a slide shaft 136, and is made in the shape of, for instance, external splines. One of the axial lengths of the internal and external tooth parts 170 and 172 is longer than the other thereof. The axial lengths of the internal and external tooth parts 170 and 172 are set in accordance with the slide range of the slide mechanism 118. In the first modification, the axial length of the external tooth part 172 is shorter than that of the internal tooth part 170. Each of the internal and external tooth parts 170 and 172 can include teeth constructed in an arbitrary form as long as rotation of the crank axle 116 can be transmitted through the teeth to the slide shaft 136 configured to be axially moved relatively to the crank axle 116. For example, the teeth can be made in the form of gear teeth, serrations or splines. The other constituent elements are the same as those of the aforementioned exemplary embodiment, and hence, will not be hereinafter explained. In the present invention, the internal tooth part 170 and the external tooth part 172 are exemplary slide elements.

The slide mechanism 118 constructed as described herein is more simply constructed than the slide mechanism 18 of the aforementioned exemplary embodiment. Additionally, at least one of the internal and external tooth parts 170 and 172 can include a solid lubricant in order to inhibit slide resistance. Moreover, at least one of the first and second slide elements 54 and 56 can include a solid lubricant.

Second Modification

Figure 10:
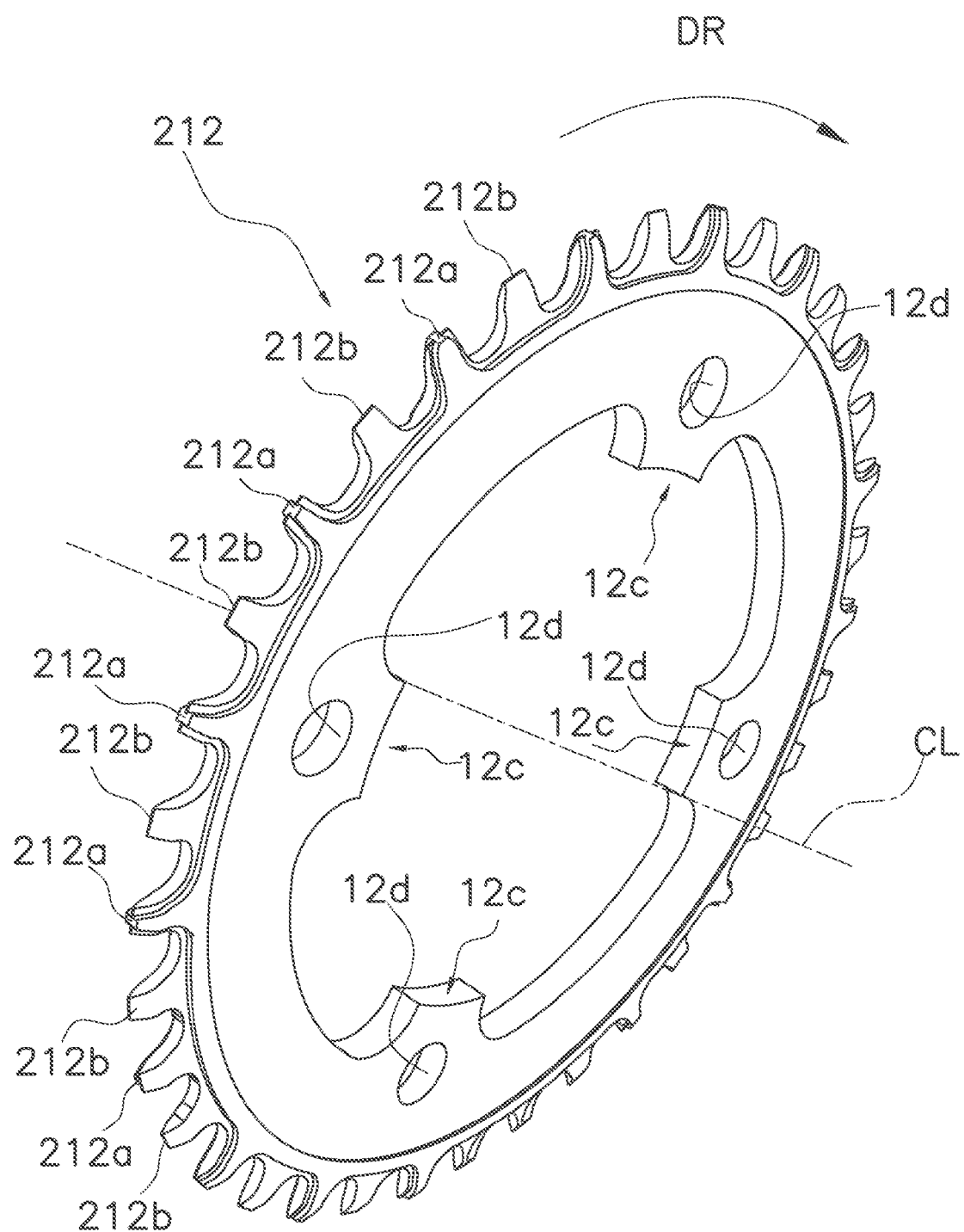
FIG. 10 is a perspective view of a sprocket according to a second modification.
Figure 11:
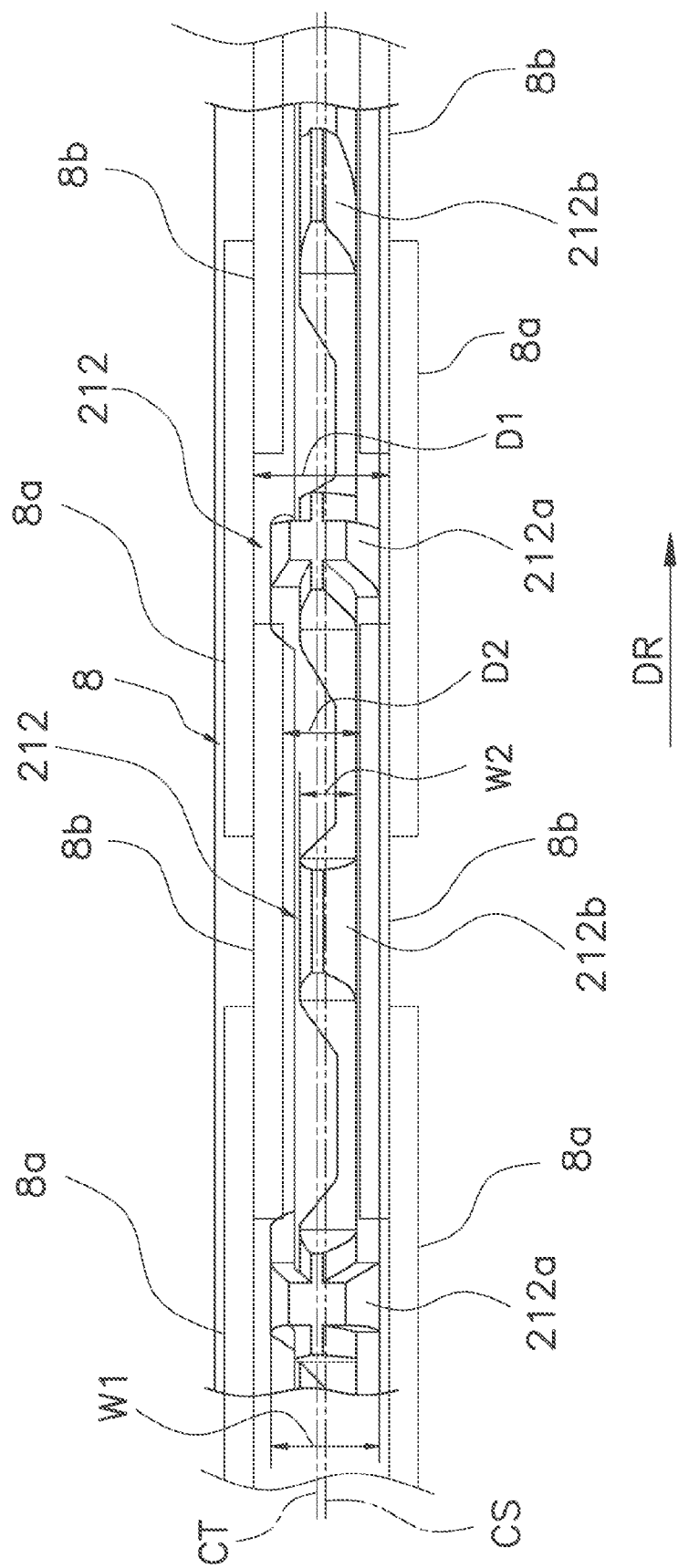
FIG. 11 is a partial edge view of the sprocket illustrated in FIG. 10 shown in a condition in which a chain is wound about the sprocket.

In the aforementioned exemplary embodiment, the teeth 12b of the sprocket 12 are set to have equal width (equal axial thickness). However, in the second modification, as shown in FIGS. 10 and 11, a sprocket 212 includes first teeth 212a and second teeth 212b having narrower width (axially thinner thickness) than the first teeth 212a. Each second tooth 212b has the same construction as each tooth 12b of the aforementioned exemplary embodiment. In FIGS. 10 and 11, reference sign DR indicates a drive rotational direction of the sprocket 212.

As shown in FIG. 11, each first tooth 212a has a first chain engaging width W1. The first chain engaging width W1 is less than an outer link space D1 between each pair of opposed outer links 8a of the bicycle chain 8, and is greater than an inner link space D2 between each pair of opposed inner links 8b of the bicycle chain 8. Each second tooth 212b has a second chain engaging width W2. The second chain engaging width W2 is smaller than the inner link space D2. The first and second chain engaging widths W1 and W2 are measured in an axial direction that is arranged in parallel to the rotational center axis CL. The first teeth 212a and the second teeth 212b are alternately disposed in the circumferential direction of the sprocket 212. A center position CT of the tooth tips of at least either of the first teeth 212a and the second teeth 212b is offset inward or outward from a center plane CS of the sprocket 212. The term "inward" herein refers to a direction from the sprocket 212 toward a bicycle frame when the sprocket 212 is mounted to the bicycle frame. On the other hand, the term "outward" herein refers to a direction from the sprocket 212 separating from the bicycle frame. In the second modification, the center position CT of the tooth tips of at least either of the first teeth 212a and the second teeth 212b is offset inward from the center plane CS of the sprocket 212. With this construction, the bicycle chain is unlikely to be disposed in an excessively oblique position even when the bicycle frame is of a type to which a rear sprocket assembly is mounted in a relatively inward position.

It should be noted that likewise, the construction of outwardly offsetting the center position CT of the tooth tips makes the bicycle chain unlikely to be disposed in an excessively oblique position even when the bicycle frame is of a type to which the rear sprocket assembly is mounted in a relatively outward position.

Other Exemplary Embodiments

One exemplary embodiment of the present invention has been explained above. However, the present invention is not limited to the above, and a variety of changes can be made without departing from the scope of the present invention. Especially, the embodiment and the plurality of modifications described in the present specification can be arbitrarily combined on an as-needed basis.

(a) In the aforementioned exemplary embodiment, the adapter member 24 is fixed to the slide shaft 36 by press-fitting. However, in the present invention, the method of fixing the adapter member 24 to the slide shaft 36 is not limited to this. For example, the adapter member 24 can be fixed to the slide shaft 36 by adhesive or diffusion bonding.

(b) In the aforementioned exemplary embodiment, the first crank arm 14a and the adapter member 24 are separately constructed for maintaining compatibility of the sprocket 12. However, the first crank arm 14a and the adapter member 24 can be integrally constructed. Alternatively, the sprocket 12 and the adapter member 24 can be integrally constructed.

(c) In the aforementioned exemplary embodiment, the number of the front sprockets is set to be one. However, the number of the front sprockets can be two or three.

(d) In the aforementioned exemplary embodiment, the crank axle 15 is provided with the second serration part 16e on the second axle end 16c, and the second serration part 16e straightly extends in parallel to the axial direction. Additionally, the second crank arm 14b is provided with the slit 14e, and is fixed to the crank axle 16 by narrowing the gap of the slit 14e with use of the bolt member (or members). However, in the present invention, the construction of the second serration part 16e and that of the slit 14e are not limited to them. The second serration part 16e, provided on the second axle end 16c of the crank axle 16, can extend in a taper shape while tilting relatively to the axial direction. On the other hand, the second crank arm 14b cannot be provided with the slit 14e.

(e) The first crank arm 14a can be constructed to be detachably fixed to the crank axle 16 by a fixing bolt.

(f) In the aforementioned exemplary embodiment, the contact member 40 includes the male threaded part 40c and is screwed into the slide shaft 36. However, in the present invention, the constructions of the contact member 40 and the slide shaft 36 and the method of fixing the contact member 40 to the slide shaft 36 are not limited to them. The contact member 40 can be fixed to the slide shaft 36 by any suitable method such as press-fitting, adhesive, diffusion bonding, or so forth. Additionally, the contact member 40 and the slide shaft 36 can be integrally constructed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank assembly comprising:
   a sprocket having a rotational center axis,
   a crank;
   a crank axle attached to the crank, the crank axle including an internal space; and
   a slide mechanism configured to displace the sprocket relatively to the crank in an axial direction parallel to the rotational center axis,
   at least part of the slide mechanism being disposed in the internal space of the crank axle.

2. The bicycle crank assembly according to claim 1, wherein
   the slide mechanism includes a slide shaft, at least part of the slide shaft being configured to move along the rotational center axis in the internal space.

3. The bicycle crank assembly according to claim 2, wherein
   the slide mechanism further includes a slide member, the slide member being disposed between a radially inner peripheral surface of the crank axle and a radially outer peripheral surface of the slide shaft in the internal space of the crank axle.

4. The bicycle crank assembly according to claim 3, wherein
   the slide member includes at least one rolling element.

5. The bicycle crank assembly according to claim 4, wherein
   the slide member includes a plurality of rolling elements, and
   the slide mechanism includes a supporting member configured to restrict positions of the rolling elements.

6. The bicycle crank assembly according to claim 3, wherein
   the slide member includes a rolling element and at least one slide element.

7. The bicycle crank assembly according to claim 6, wherein
   the at least one slide element includes a first slide element and a second slide element, and
   the rolling element is located between the first slide element and the second slide element in the axial direction.

8. The bicycle crank assembly according to claim 6, wherein
   the at least one slide element includes a solid lubricant.

9. The bicycle crank assembly according to claim 3, wherein
   the slide member includes a slide element.

10. The bicycle crank assembly according to claim 9, wherein
    the slide element includes a solid lubricant.

11. The bicycle crank assembly according to claim 2, wherein
    the slide shaft includes a first end and a second end, and
    the first end is located inside the internal space of the crank axle while the second end is located outside the internal space of the crank axle while the slide mechanism is attached to the crank axle.

12. The bicycle crank assembly according to claim 11, wherein
    the sprocket is attached to the second end of the slide shaft.

13. The bicycle crank assembly according to claim 12, further comprising:
    a first fixing bolt fixing the sprocket to the second end of the slide shaft.

14. The bicycle crank assembly according to claim 12, wherein
    the sprocket is attached to the second end of the slide shaft through an adapter member.

15. The bicycle crank assembly according to claim 14, wherein
    the slide shaft is press-fitted to the adapter member.

16. The bicycle crank assembly according to claim 14, wherein
    the slide shaft is adhesively fixed to the adapter member.

17. The bicycle crank assembly according to claim 14, wherein
    the slide shaft is diffusion bonded to the adapter member.

18. The bicycle crank assembly according to claim 11, wherein
    the slide mechanism includes a contact member, the contact member being attached to the first end of the slide shaft.

19. The bicycle crank assembly according to claim 18, wherein
    an axial position of the contact member is adjustable relative to the slide shaft.

20. The bicycle crank assembly according to claim 18, wherein
    the contact member is threadedly engaged with the first end of the slide shaft.

21. The bicycle crank assembly according to claim 18, wherein
    the contact member includes a first contact part and a second contact part, the second contact part being axially separated from the first contact part.

22. The bicycle crank assembly according to claim 21, wherein
    the first contact part extends radially outwardly from an outer peripheral surface of the contact member.

23. The bicycle crank assembly according to claim 21, wherein
    the first contact part circumferentially extends on an outer peripheral surface of the contact member.

24. The bicycle crank assembly according to claim 21, wherein
    the slide mechanism further includes a first cushioning member, the first cushioning member being configured to make contact with the first contact part of the contact member.

25. The bicycle crank assembly according to claim 21, wherein
    the slide mechanism further includes a second cushioning member, the second cushioning member being configured to make contact with the second contact part of the contact member.

26. The bicycle crank assembly according to claim 25, wherein
   the crank includes a first crank arm and a second crank arm,
   the crank axle includes a first axle end and a second axle end, and
   the first crank arm is fixed to the first axle end.

27. The bicycle crank assembly according to claim 26, further comprising:
   a second fixing bolt fixing the second crank arm to the second axle end,
   the second cushioning member being fixed to the second fixing bolt.

28. The bicycle crank assembly according to claim 27, wherein
   the second cushioning member includes an attachment part and a cushioning part, the attachment part being attached to the second fixing bolt, the cushioning part axially extending from the attachment part.

29. The bicycle crank assembly according to claim 27, wherein
   the second cushioning member is adjustable in an axial position relative to the second fixing bolt.

30. The bicycle crank assembly according to claim 27, wherein
   the second cushioning member is screwed to the second fixing bolt.

31. The bicycle crank assembly according to claim 26, wherein
   the first axle end is press-fitted to the first crank arm.

32. The bicycle crank assembly according to claim 26, wherein
   the first axle end is adhesively fixed to the first crank arm.

33. The bicycle crank assembly according to claim 26, wherein
   the first axle end is diffusion bonded to the first crank arm.

34. The bicycle crank assembly according to claim 1, wherein
   the sprocket includes at least one first tooth and at least one second tooth,
   the at least one first tooth has a first chain engaging width, the first chain engaging width being less than an outer link space between a pair of opposed outer links of a bicycle chain, the first chain engaging width being greater than an inner link space between a pair of opposed inner links of the bicycle chain, and
   the at least one second tooth has a second chain engaging width, the second chain engaging width being less than the inner link space.

35. The bicycle crank assembly according to claim 34, wherein
   the at least one first tooth and the at least one second tooth are alternately disposed in a circumferential direction of the sprocket.

36. The bicycle crank assembly according to claim 34, wherein
   the at least one first tooth has a first tooth tip and the at least one second tooth has a second tooth tip, at least one of the first tooth tip and the second tooth tip being axially inwardly offset from an axial center plane of the sprocket.

37. The bicycle crank assembly according to claim 34, wherein
   the at least one first tooth has a first tooth tip and the at least one second tooth has a second tooth tip, at least one of the first tooth tip and the second tooth tip being axially outwardly offset from an axial center plane of the sprocket.

* * * * *